(12) United States Patent
Coing et al.

(10) Patent No.: US 11,305,644 B2
(45) Date of Patent: Apr. 19, 2022

(54) METHOD FOR FORMING A WELDING SPOUT ON A PARISON DURING THE BLOWING OF A TANK

(71) Applicant: PLASTIC OMNIUM ADVANCED INNOVATION AND RESEARCH, Brussels (BE)

(72) Inventors: Jean-Francois Coing, Clairoix (FR); Sebastien Jouie, Margny les Compiegne (FR); Yvonnig Guezennec, Venette (FR); Philippe Coulon, Saint Just en Chaussee (FR); Andre George, Mery la Bataille (FR); Jozef Franko, Rovinka (FR)

(73) Assignee: PLASTIC OMNIUM ADVANCED INNOVATION AND RESEARCH, Brussels (BE)

( * ) Notice: Subject to any disclaimer, the term of this patent is extended or adjusted under 35 U.S.C. 154(b) by 69 days.

(21) Appl. No.: 16/585,545

(22) Filed: Sep. 27, 2019

(65) Prior Publication Data

US 2020/0023730 A1 Jan. 23, 2020

Related U.S. Application Data

(62) Division of application No. 15/108,340, filed as application No. PCT/FR2014/053559 on Dec. 26, 2014, now Pat. No. 10,471,823.

(30) Foreign Application Priority Data

Dec. 27, 2013 (FR) ...................................... 1363620

(51) Int. Cl.
*B60K 15/04* (2006.01)
*B29C 49/20* (2006.01)
(Continued)

(52) U.S. Cl.
CPC .............. *B60K 15/04* (2013.01); *B29C 49/20* (2013.01); *B29C 51/12* (2013.01);
(Continued)

(58) Field of Classification Search
None
See application file for complete search history.

(56) References Cited

U.S. PATENT DOCUMENTS 6,338,420 B1 1/2002 Pachciarz et al.
7,600,652 B1 10/2009 Johansen
(Continued)

FOREIGN PATENT DOCUMENTS

DE 102 14 900 A1 4/2004
EP 1 110 697 A2 6/2001

OTHER PUBLICATIONS

International Search Report dated Mar. 11, 2015 in PCT/FR2014/053559 filed Dec. 26, 2014.

*Primary Examiner* — Monica A Huson
(74) *Attorney, Agent, or Firm* — Oblon, McClelland, Maier & Neustadt, L.L.P.

(57) ABSTRACT

The invention relates to a tank of plastics material produced by blow-molding of a parison, incorporating a welding spout, of a shape projecting from its outer surface which has an edge configured to be welded to a corresponding edge of an attached part, the welding spout ending axially, on an inside of the tank, in a shape resulting from contact molding between the parison and a molding component, in which the welding spout ends axially on an outside of the tank in a shape resulting from contact molding between the parison and a molding component.

5 Claims, 3 Drawing Sheets

(51) Int. Cl.
  B29C 51/12 (2006.01)
  B60K 15/03 (2006.01)
  B65D 25/42 (2006.01)
  *B29L 31/00* (2006.01)
  *B29C 51/26* (2006.01)
  *B29K 23/00* (2006.01)
  *B29C 49/48* (2006.01)
  *B29C 49/04* (2006.01)
  *B29C 49/22* (2006.01)
  *B29C 49/42* (2006.01)
  *B29K 31/00* (2006.01)

(52) U.S. Cl.
  CPC ........ B60K 15/03177 (2013.01); B65D 25/42 (2013.01); *B29C 49/04* (2013.01); *B29C 49/22* (2013.01); *B29C 49/4273* (2013.01); *B29C 51/267* (2013.01); *B29C 2049/2017* (2013.01); *B29C 2049/2034* (2013.01); *B29C 2049/2065* (2013.01); *B29C 2049/4807* (2013.01); *B29C 2049/4897* (2013.01); *B29C 2793/009* (2013.01); *B29C 2793/0018* (2013.01); *B29K 2023/065* (2013.01); *B29K 2023/086* (2013.01); *B29K 2031/04* (2013.01); *B29L 2031/7172* (2013.01); *B60K 2015/03046* (2013.01)

(56) References Cited

U.S. PATENT DOCUMENTS

| | | |
|---|---|---|
| 2001/0015513 A1 | 8/2001 | Schaftingen et al. |
| 2009/0308881 A1 | 12/2009 | Eulitz et al. |
| 2010/0072200 A1* | 3/2010 | Marquardt ............. B60K 15/04 220/86.2 |
| 2011/0221104 A1 | 9/2011 | Criel et al. |
| 2013/0092317 A1 | 4/2013 | Eulitz et al. |

* cited by examiner

METHOD FOR FORMING A WELDING SPOUT ON A PARISON DURING THE BLOWING OF A TANK

This application is a Divisional of U.S. application Ser. No. 15/108,340, filed on Jun. 27, 2016, which is a National Stage of application PCT/FR2014/053559, filed on Dec. 26, 2014, which claims priority to FR 1363620, filed on Dec. 27, 2013.

This invention relates to the manufacture of plastics tanks, in particular fuel tanks.

In order to manufacture tanks from plastics material, multilayer parisons which in particular contain within them a barrier layer, for example of EVOH, are used. A parison is a foliar or tubular extrudate that is inserted into a mold and within which excess pressure is established to press the said extrudate against the mold to shape it into the desired shape of the tank.

In order to weld attached parts to tanks of plastics material it is known that "welding spouts", that is to say projecting shapes which have an edge, which is generally flat, capable of being heated so as to be welded to a corresponding edge of an attached part, are known. The attached part may be a pipe, a connection, a ventilation pipe, the list not being of any restrictive nature.

The welding spout is formed during blowing of the parison and requires that the material constituting the parison should flow substantially in such a way that the said material will fill a special recess delimiting the outer shape of the welding spout.

In some cases, as a result of this flow, the barrier layer located within the parison migrates to some depth in the recess and may be located close to the area of the welding spout involved in welding. This zone is generally defined over a thickness of a few mm, measured from the welding plane.

The object of this invention is to provide a new process for forming the welding spout during blowing of the parison.

In accordance with this process the following stages are carried out in a blowing mold comprising two cavities and an insert, one of the cavities delimiting a recess for forming the welding spout, the said recess having a opening opening opposite the insert:
- a push member is provided on the insert opposite the opening of the recess in the cavity, the push member being capable of adopting a first position set back from the recess and a second position in which the push member occupies a portion of the opening of the recess,
- the push member is positioned in its first position,
- the parison is blown so as to match the shape of the cavities,
- as the parison flows towards the interior of the recess the push member is advanced into its second position.

As a result of the invention, the presence of the push member in the opening of the recess limits migration of the barrier layer of the parison towards the zone where the welding spout is welded.

In a preferred embodiment provision is also made for a plunger moving on the cavity to delimit the recess facing the push member, the moving plunger being capable of adopting a first position and a second position, the volume of the recess being smaller in the second position than in the first, and while the parison is flowing towards the interior of the recess the moving plunger is placed in its second position.

In practical terms it is simpler for movement of the movable plunger to be such that the volume of the recess is a maximum when the moving plunger is in its first position and a minimum when the moving plunger is in its second position.

The fact that the moving plunger pushes back the material which has flowed into the recess further helps to hold the barrier layer at a distance from the welding zone.

In a particular embodiment of the invention, the moving plunger moves concomitantly with the push member.

Alternatively movement of the moving plunger is initiated after the push member has moved.

In a particular embodiment of the invention the push member comprises a head and a shoulder.

Preferably the push member is dimensioned in such a way as to allow play between the head of the push member and the parison in the second position and in a direction transverse to movement of the push member. Such play is obtained for example in accordance with the following formula, where A is the distance measured between the head of the push member and the cavity measured in the direction of movement of the push member, B is the distance measured between the head of the push member and the cavity measured in the direction transverse to the movement of the push member, and C is the distance between the shoulder of the push member and the cavity in the direction of movement of the push member:

$$A = 4/B \text{ and } C \geq 6 \text{ mm}$$

Through its construction distance C corresponds to the thickness of the parison at the shoulder of the push member.

In accordance with the invention plastics materials are understood to be materials comprising at least one synthetic resin polymer.

All types of plastics materials may be suitable. Suitable plastics materials will belong to the category of thermoplastic materials.

By thermoplastic material is intended any thermoplastic polymer, including thermoplastic elastomers, as well as mixtures thereof. By the term "polymer" is intended both homopolymers and copolymers (in particular binary or ternary ones). Examples of such copolymers are, without limitation: randomly distributed copolymers, sequenced copolymers, block copolymers and graft copolymers.

All types of thermoplastic polymers or copolymers whose melting point is below the decomposition temperature are suitable. Synthetic thermoplastic materials which have a melting point range extending over at least 10 degrees Celsius are particularly suitable. An example of such materials are those which have polydispersity of their molecular mass.

In particular polyolefins, thermoplastic polyesters, polyketones, polyamides and their copolymers may be used. A mixture of polymers or copolymers may also be used, as well as a mixture of polymeric materials with inorganic, organic and/or natural fillers such as, for example, but not limited to: carbon, salts and other inorganic derivatives, natural or polymer fibres. It is also possible to use multilayer structures comprising stacked incorporated layers comprising at least one of the polymers or copolymers described above.

A polymer often employed is polyethylene. Excellent results have been obtained with high density polyethylene (HDPE). Preferably tanks also incorporate a layer of resin which is impermeable to fuel such as for example EVOH (partly hydrolysed ethylene-vinyl-acetate copolymer). Alternatively or in addition it may undergo surface treatment (fluorination or sulfonation) in order to render it impermeable to fuel.

The invention also relates to a tank of plastics material derived from molding by blowing a parison incorporating a welding spout, that is to say a shape projecting from its outer surface which has an edge capable of being welded to a corresponding edge of an attached part, the said welding spout ending axially on the inside of the tank in a shape resulting from molding by contact between the parison and a molding element.

As claimed in particular advantageous but optional characteristics of the invention, which may be adopted alone or in combination:
- the welding spout ends axially on the inside of the tank as an internal rim in the form of a ring,
- the welding spout ends axially on the outside of the tank as a shape resulting from contact molding between the parison and a molding element,
- the welding spout ends axially on the outside of the tank as a radial flat surface in the form of a ring,
- the welding spout comprises an internal rim in the form of a ring set back from the radial planar surface,
- the welding spout has a shape not derived by revolution so as to offer better mechanical strength.

The invention will be better understood from a reading of the appended figures, which are provided by way of example and are not in any way limiting, in which.

Figure 1:
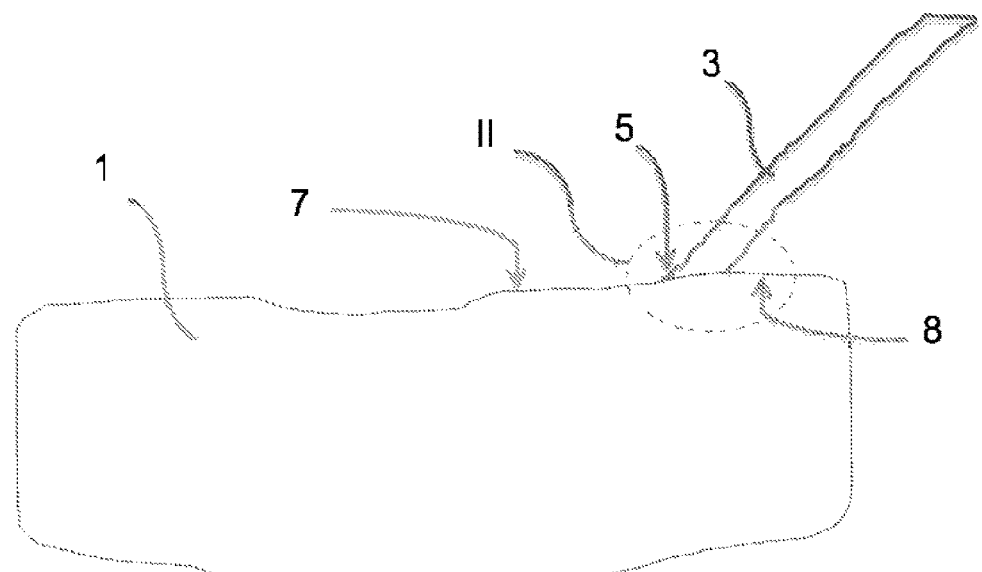
FIG. 1 is a view in elevation of a fuel tank provided with a filling pipe.

Reference is now made to FIG. 1, in which a tank 1 of generic shape may be seen. In reality the shape of the tank will depend on the vehicle, but this shape is of no importance in the context of the invention, which applies to tanks of all shapes. This tank will have been manufactured by the blowing of a parison, as is known, within a blowing mold (not illustrated). An example of such manufacture is described for example in EP 1110697 A2, the contents of which are incorporated in this description as a reference.

The tank is a multilayer tank, of high density polyethylene (HDPE) with at least one layer of EVOH (partly hydrolyzed ethylene-vinyl acetate copolymer), which ensures a seal against hydrocarbons and is referred to as a "barrier layer".

Tank 1 comprises a filling pipe 3 which is intended to connect the fuel cap (not shown) of the vehicle to tank 1. Pipe 3 is connected to tank 1 by welding. For this purpose it comprises a material compatible with the material of which the tank is made, at least in the regions which are in contact with these two welded components.

Figure 3:
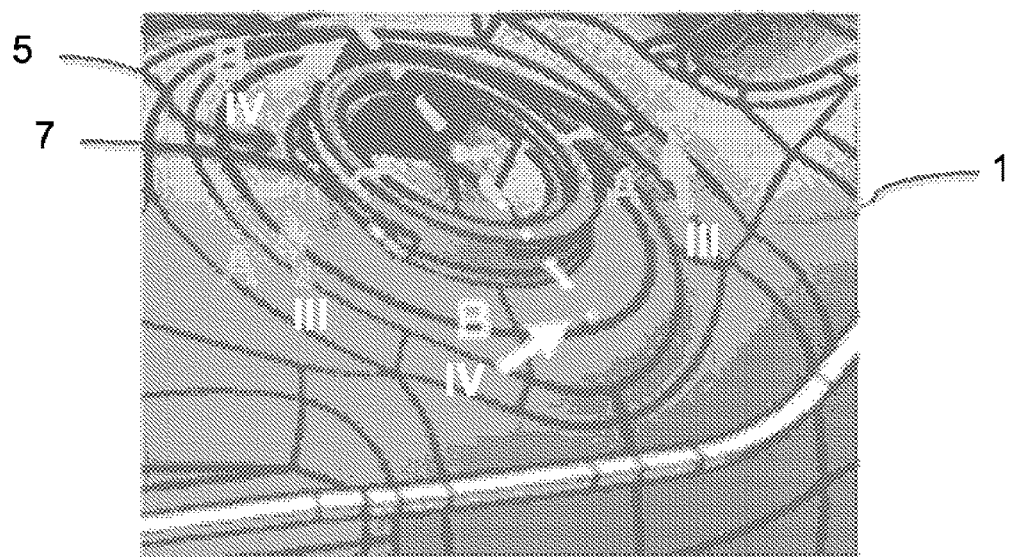
FIG. 3 is a perspective view of the same part II, seen from above.
Figure 4:
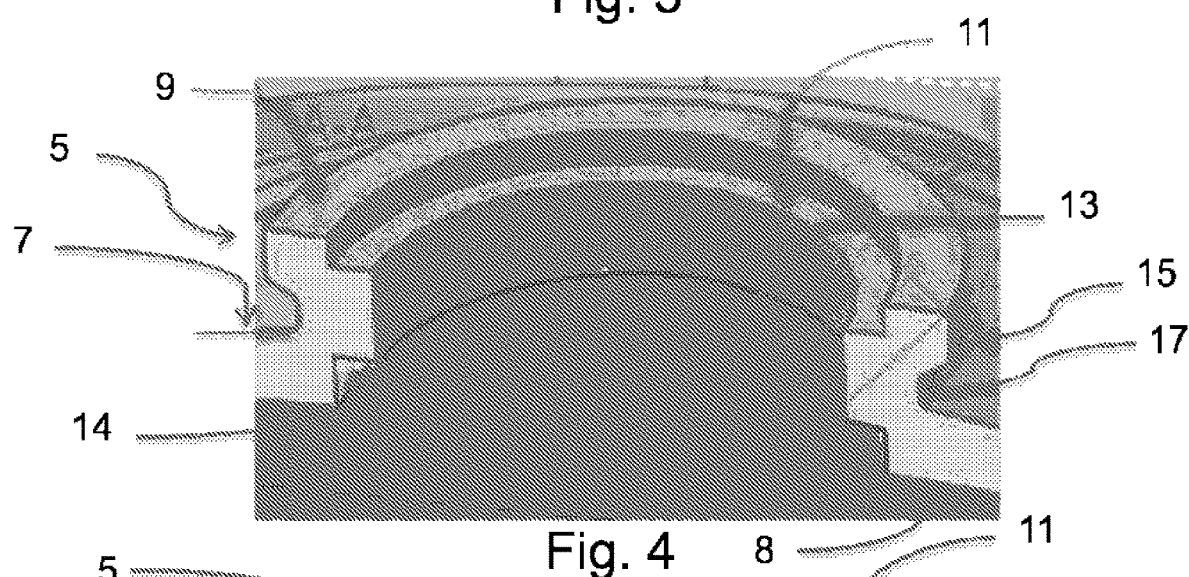
FIG. 4 is a perspective and cross-sectional view along the plane III-III in FIG. 3.
Figure 5:
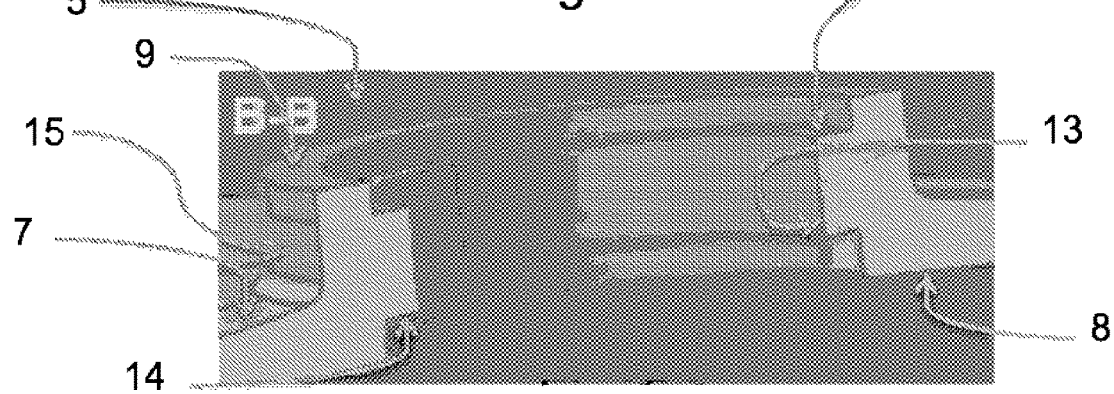
FIG. 5 is a view similar to that in FIG. 4, along a plane IV-IV perpendicular to plane III-IIII.

For welding with pipe 3 the tank has a welding spout 5, which can be seen in FIGS. 3 to 5.

Welding spout 5 projects from the outer surface 7 of the tank, here in the form of a protrusion that is generally flared derived by revolution, which terminates axially in a radial planar surface 9 in the shape of a ring.

Flat surface 9 is a welding surface, to which the end of filling pipe 3 is welded after the parison has been shaped by blowing in order to secure said filling pipe 3 to tank 1 in a strong leaktight manner.

In FIG. 4 it will be seen that in addition to flat surface 9 welding spout 5 has an internal rim 11 on the outside of the tank which, like flat surface 9, faces the outside of tank 1. Internal rim 11 forms a ring of smaller diameters which lies set back from flat surface 9. It is flat and parallel to said surface 9. Because of the presence of internal rim 11, internal surface 13 of spout 5 ends in a shape which is generally flared, with a stepped cross-section. Flat surface 9 and internal rim 11 may have any shape, provided that they allow the welding spout to be used to connect the tank to an external accessory such as pipe 3, but in accordance with the invention these shapes result from contact molding between sheet 18 (or more generally the parison) and a molding element, as will be seen subsequently.

On the inside of the tank the welding spout ends axially in a second internal rim 14, similar to first internal rim 11, that is to say forming a ring of smaller diameters set back from internal surface 8 of the tank. Internal rim 14 may have any shape, but in accordance with the invention it is the result of contact molding between sheet 18 (or more generally the parison) and a molding element, as will be seen subsequently.

As will be seen in FIG. 5, the outer lateral surface 15 of welding spout 5 is cylindrical, except for two diametrically opposite grooves 17 which can be seen in FIGS. 3 and 4.

These grooves 17 are used for positioning a finishing tool in order to perform finishing operations on the tank after it has been molded, and in particular the drilling of spout 5, as will be described subsequently.

Furthermore these grooves 17 prevent the welding spout from having a shape derived by revolution, that is to say one which does not change throughout any rotation about its axis, which provides better mechanical strength for the welding spout according to tests performed by the inventors.

The process as claimed in the invention will now be described through a particular and non-limiting embodiment.

As described in EP 1110697 A2, a parison comprising two sheets 18 of multilayer plastics material is extruded from an extrusion die and is lowered into a mold (not shown).

This mold comprises two matching halves, known as shells or molds or cavities, and a central insert which may be placed between two shells.

In accordance with the known process, once the two sheets of the parison have been lowered between the cavities on either side of the insert, each of the two cavities closes on the insert in such a way as to close the mold for a first time. Excess pressure of gas, generally air, is then established between the insert and each sheet of the parison in such a way as to press the sheet against the internal wall of the cavity and impart shape to it. This stage is described as blowing. As blowing takes place, accessories previously installed on the insert and carried by suitably moving structures are advanced in the direction of one or other of the sheets, applied against the sheet and welded to it. This operation makes it possible to insert various accessories such as ventilation valves and pipes into the tank without having to insert them into the mold after molding. After this shaping the two cavities each bearing a sheet of the parison move away from the insert and the latter is withdrawn from between the two cavities. The two cavities are finally caused to approach each other in such a way as to close the mold for a second time, this time bringing the peripheries of the two sheets into contact, peripheries which weld to each other and form the tank.

The invention to which this application relates is implemented in the course of performance of this known process during its blowing stage.

It may be required to form a welding spout on one or both of sheets 18 of the parison, depending upon the desired functions for the tank. Here the invention only describes a single welding spout and a single sheet 18, but this indication is not in any way limiting.

Figure 2:
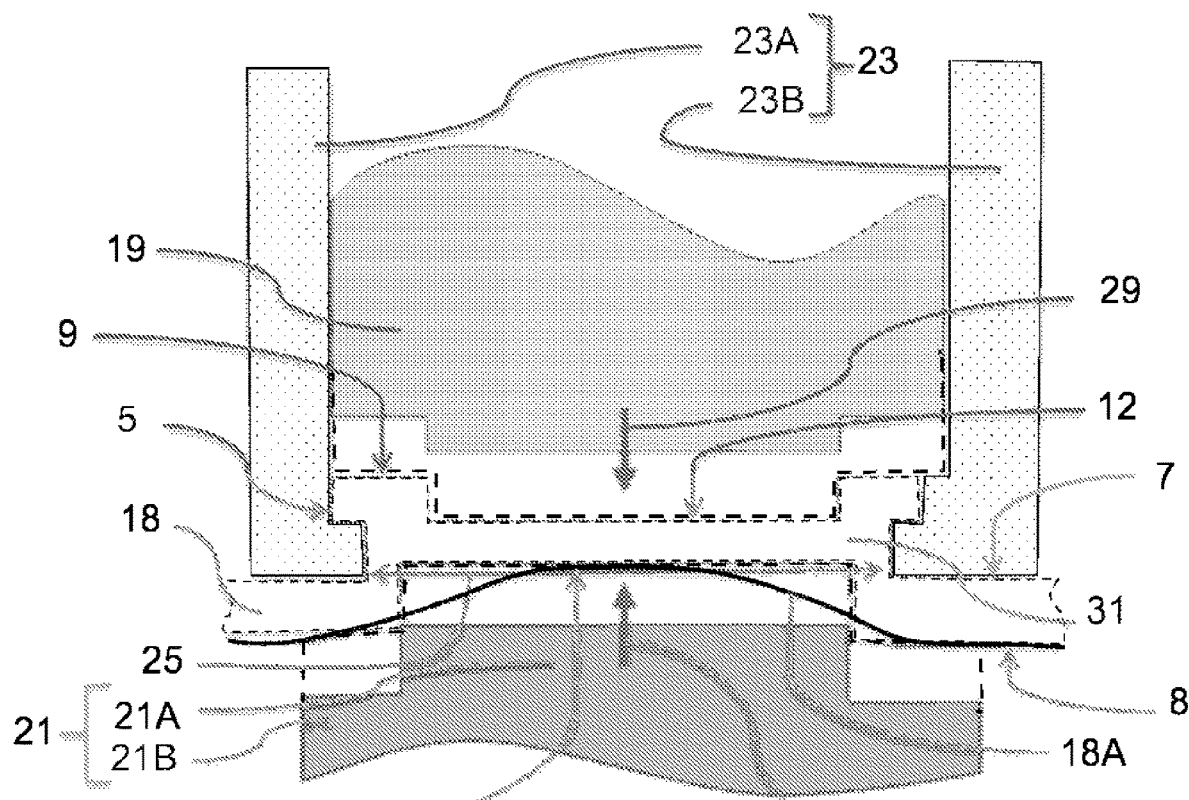
FIG. 2 is a view in cross-section of a part II of the tank in FIG. 1, showing a welding spout in a first embodiment.

FIG. 2 illustrates two moving inserts 19 and 21 which will be described as moving plunger 19 and push member 21 on either side of the sheet 18 of the extruded parison. Push member 21 is carried by the insert (not shown, it is located below sheet 18 in relation to FIG. 2), while moving plunger 19 is carried by one of the two cavities (not shown, the cavity bearing moving plunger 19 is located above sheet 18 in relation to FIG. 2). Around moving plunger 19 the shell also comprises a spout mold 23, in two parts, 23A and 23B, which are capable of moving within the plane of the figure between a closed position which may be seen in FIG. 2 and an open position in which each of two parts 23A and 23B is separated from the other by a sufficient distance to allow the spout to be released from the mold after it has been shaped in spout mold 23.

Spout mold 23, in combination with moving plunger 19, delimits a recess 31 for forming a welding spout. This recess 31 has an opening 25 which opens out opposite the insert.

Push member 21 comprises a head 21A and a shoulder 21B. It faces opening 25 of recess 31. It is capable of adopting a first position set back from recess 31, which can be seen in FIG. 2, and a second position shown as a dashed line in FIG. 2 in which it occupies part of the opening 25 of recess 31. The movement of push member 21 from the aforesaid first position to the aforesaid second position is shown by arrow 27.

Moving plunger 19 may also move as indicated by arrow 29 between a set-back position as shown in FIG. 2 and a forward position illustrated by a dashed line.

Thus moving plunger 19 is capable of adopting a first position in which the volume of recess 31 is a maximum and a second position in which the volume of recess 31 is a minimum.

In the second position, referred to as the forward position, moving plunger 19 bears against the plastics material of the parison and by molding imparts to it its final shape delimited by the dashed line on the side of the cavity of the mold.

In the first position, referred to as the set-back position, moving plunger 19 allows the material of the parison to move forward in recess 31 if it experiences a thrust from the direction of the insert in the mold, in particular through the effect of the excess pressure during the stage of blowing the parison.

In order to implement the invention the following stages are carried out during the blowing stage in a process for shaping a tank.

In this stage the parison of two sheets 18 is extruded and each shape 18 is placed between the insert and each of the two cavities of the mold. The mold is closed onto the insert.

Moving plunger 19 and push member 21 are placed in their first positions. Spout mold 23 is closed, in the position in FIG. 2.

Subsequently air is injected under pressure between each sheet 18 and the insert to shape it to the shape of the cavity against which it is thus pushed. This blowing causes the plastics material of sheet 18 to flow towards and into recess 31. Sheet 18 then forms a hollow 18A on the side of the insert.

While the material of sheet 18 is flowing towards the interior of recess 31 push member 21 is advanced into its second position, shown by a dashed line. The head 21A of the push member penetrates recess 31 and shoulder 21B bears against sheet 18. Sheet 18 then adopts a shape corresponding to the side of the insert, as indicated by the dashed line. In particular push member 21 plays the part of a molding component with regard to the sheet and forms a flat portion 30 corresponding to future internal rim 14.

In a second operation, determined in relation to the operating conditions during blowing, which are defined in particular by the thickness of the parison, the duration and pressure of blowing, and the temperatures of the components present, moving plunger 19 is placed in its second position shown by a dashed line.

Sheet 18 thus adopts the corresponding shape, with flat radial surface 9 in the shape of a ring and an internal flat surface 12 corresponding to future internal rim 11 previously described with reference to FIG. 4. In other words moving plunger 19 acts as a molding component with regard to sheet 18.

Once push member 21 and moving plunger 19 have both reached their second position, they remain immobile until the end of the blowing stage. Depending upon the different parameters for molding the tank, the invention may take place throughout the entire blowing stage (in which case it begins at the same time as air is injected under pressure and ends when the blowing pressure ceases) or only part of the blowing stage (for example it may start after air has been injected and/or end before the blowing pressure ceases).

After sheet 18 has been sufficiently cooled to allow the tank to be released from the mold, the two cavities of the mold separate, spout mold 23 opens and the tank is released from the mold.

In a finishing operation the wall of the tank is then drilled out to its entire thickness between flat portion 12 and flat portion 30 so as to cut out the internal surface 13 of the spout and define internal rims 11 and 14. A drilling tool which is fastened onto grooves 17 of spout 5 is used for this purpose.

Figure 6:
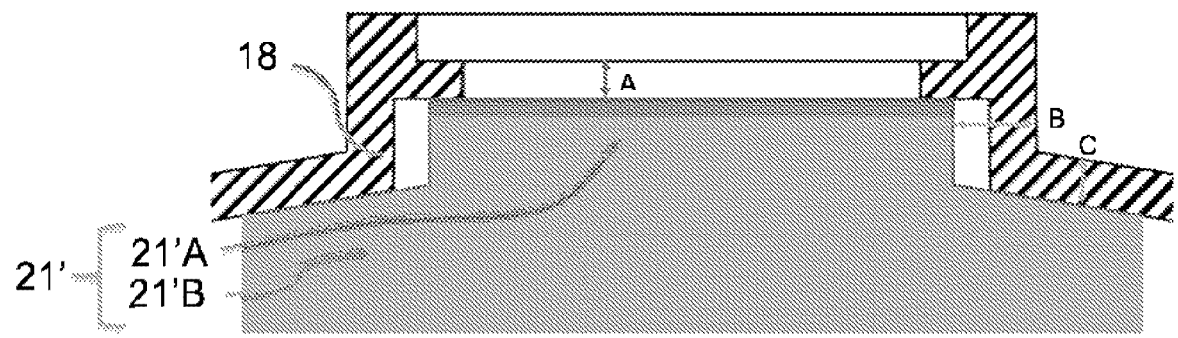
FIG. 6 is a view similar to that in FIG. 2 of another embodiment of the invention.
Figure 7:
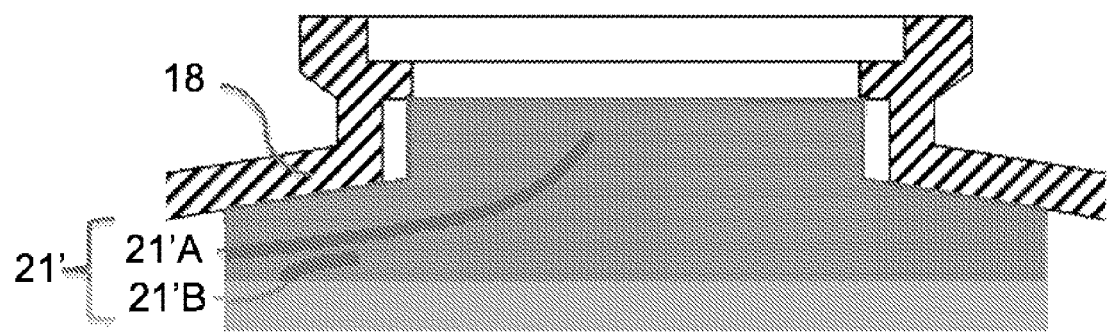
FIG. 7 is a view similar to that in FIG. 6, in a perpendicular cross-sectional plane.

In the embodiment illustrated in FIGS. 6 and 7 a push member 21' whose head 21'A is smaller than that 21A of push member 21 previously described is used. Push member 21' thus leaves lateral play between sheet 18 and head 21'A which makes it possible to control flow of the material in a better way when forming the welding spout.

Having regard to distance A measured in the direction of movement of the push member between head 21'A of the push member and the cavity, distance B measured in a direction transverse to the movement of the push member between head 21'A of the push member and the cavity and distance C measured in the direction of movement of the push member between the shoulder of push member 21'B and the cavity, it will be found that ratio A/B is less than 4 and that the value of C is less than 6 mm.

Measurements made by the inventors on tanks manufactured as claimed in the invention have shown that the barrier layer of the multilayer parison lies at a sufficient distance from surface 9 so that subsequent welding of this surface 9 to an attached part such as a pipe does not damage this barrier layer. This adequate positioning of the barrier layer within the wall of the tank is the result of the action of moving plunger 19, accentuated by that of push member 21, in the course of the blowing stage.

Furthermore, with a multilayer parison comprising virgin material and ground up material (such as for example is obtained from the recovery of rejects), the distribution of the layers of the multilayer parison remains fairly uniform, whereas without the action of plunger 19 it has been found that virgin material tends to be lacking in the welding spout while ground up material tends to be present there in excess quantity.

The invention is not limited to the embodiments presented and other embodiments will be clearly apparent to those skilled in the art.

The invention claimed is:

1. A tank of plastics material produced by blow-molding of a multilayer parison comprising at least a barrier layer, incorporating a welding spout, of a shape projecting from the outer surface of the tank,
   the welding spout having an external radial shape resulting from contact molding between the parison and a spout mold,
   the welding spout ending axially, on an inside of the tank, in a shape resulting from contact molding between the parison and a first molding component, and
   in which the welding spout ends axially on an outside of the tank in a shape resulting from contact molding between the parison and a second molding component, the shape having an edge configured to be welded to a corresponding edge of an external attached part,
   the second molding component being different from the first molding component, both being configured to contact the multilayer parison during blow-molding allowing the edge to be welded of the welding spout to be distant from the barrier layer of the multilayer parison.

2. The tank as claimed in claim 1, wherein the welding spout ends axially on the inside of the tank in an internal rim in a shape of a ring.

3. The tank as claimed in claim 1, wherein the welding spout ends axially on the outside of the tank in a radial flat surface in a shape of a ring.

4. The tank as claimed in claim 3, wherein the welding spout comprises an internal rim in a shape of a ring set back from the flat radial surface.

5. The tank as claimed in claim 1, wherein the welding spout has a shape.

* * * * *